(12) United States Patent
Miley et al.

(10) Patent No.: US 6,188,746 B1
(45) Date of Patent: Feb. 13, 2001

(54) SPHERICAL INERTIAL ELECTROSTATIC CONFINEMENT DEVICE AS A TUNABLE X-RAY SOURCE

(75) Inventors: George H. Miley; Yibin Gu, both of Champaign, IL (US)

(73) Assignee: The Board of Trustees of University of Illinois, Urbana, IL (US)

( * ) Notice: Under 35 U.S.C. 154(b), the term of this patent shall be extended for 0 days.

(21) Appl. No.: 09/297,506

(22) PCT Filed: Oct. 31, 1997

(86) PCT No.: PCT/US97/19307

§ 371 Date: Aug. 6, 1999

§ 102(e) Date: Aug. 6, 1999

(87) PCT Pub. No.: WO98/20499

PCT Pub. Date: May 14, 1998

Related U.S. Application Data (60) Provisional application No. 60/030,009, filed on Nov. 1, 1996.

(51) Int. Cl.[7] .................................................. G21G 4/00
(52) U.S. Cl. ............................................. 378/119; 378/121
(58) Field of Search ..................................... 378/119, 121, 378/123, 124, 134, 136, 137

(56) References Cited

U.S. PATENT DOCUMENTS

| | | | |
|---|---|---|---|
| 4,955,045 | 9/1990 | Friede et al. | 378/122 |
| 5,323,422 | 6/1994 | Golovanivsky | 378/119 |
| 5,504,795 | * 4/1996 | McGeoch | 378/119 |

* cited by examiner

*Primary Examiner*—David P. Porta
(74) *Attorney, Agent, or Firm*—Sughrue, Mion, Zinn, Macpeak & Seas, PLLC (57) ABSTRACT

A low cost small-scale tunable X-ray source, comprising a spherical-electron injected inertial electrostatic confinement (IEC) device. Within a spherical containment vessel (402) recirculatory focusing electrons are accelerated by a spherical grid (401) within the vessel, and cause electron—electron collisions in a dense, central plasma core region (404) of the sphere. The IEC synchrotron source (IEC-SS) in a mechanism for generating tunable X-ray radiation is essentially equivalent to that for conventional synchrotron sources. The IEC-SS operates at a much lower electron energy (<100 kev compared with >200 Mev in a synchrotron), but still gives the same X-ray energy due to the small-scale bending radius associated with the electron—electron interactions. The X-rays can be filtered for particular purposes using diffraction gratings, prisms or the like.

26 Claims, 8 Drawing Sheets

SPHERICAL INERTIAL ELECTROSTATIC CONFINEMENT DEVICE AS A TUNABLE X-RAY SOURCE

This application claims domestic priority from U.S. Provisional Application Ser. No. 60/030,009 filed Nov. 1, 1996, and the entire e content of that application is incorporated herein by reference.

BACKGROUND OF THE INVENTION

The development of a compact, tunable, hard x-ray source would have profound and wide ranging applications in a number of areas. These areas include x-ray diagnostics, medical imaging, microscopy, nuclear resonance absorption, solid-state physics and material science.

Currently, varieties of x-ray generators exist. The most modern devices are generally based on one of three methodologies: laser and discharge plasmas, electron impact sources, and synchrotron. The spectrum of these sources can be divided into two categories: characteristic x-rays and continuum x-rays. The characteristic x-ray sources are dependent on the particular atomic structure of the gas or target material in use. Among all the types of x-ray sources, only synchrotron produces continuum radiation.

The main interest in laser-generated plasma is directed towards inertial confined fusion. Recently, they have also gained interest as sources of (V)UV and x-rays. Laser-generated plasmas emit photons in an energy range, which can extend from visible light to hard x-rays. The observed emission spectrum is characteristic of a high-temperature, short-lived, high-density plasma. The sources produce a spectrum of x-rays centered about characteristic lines of the material.

In a laser-generated plasma x-ray source, when a high-power pulsed laser is focused on a (solid) target, a plasma is created. After the laser pulse terminates, the plasma cools extremely rapidly due to rapid thermal conduction, electron energy loss to ions, and expansion of the plasma into the surrounding vacuum. Cooling of the electrons at high density leads to fast recombination, quenching of the highly excited states, and a termination of the x-ray emission. The choice of target material controls the intrinsic range of the spectral output determined by the ionization states of the target material. Details of the spectral distribution are highly dependent on the target material (e.g., carbon, aluminum, titanium, copper, zinc, molybdenum, tin, tungsten, and lead) and other parameters (target thickness and source size).

Plasma discharge systems have been suggested as sources of high brightness x-ray radiation. Most of these devices (the gas puff J. Pearlman an J. C. Riordan, J. Vac. Sci. Technol. 19, 1190 (1981), plasma focus Y. Kato, et al, Appl. Phys. Lett. 48,686 (1986), and hypocycloidal pinch K. S. Han, et al, Bull. Am. Phys. 31, (1986)) are variations of the Z-pinch geometry. In Z-pinch devices, a high current is produced on the outer edge of a cylindrical volume of gas using a pulsed electrical driver such as a fast capacitor bank. The resulting JxB force accelerates the plasma shell radially inward to form a very high-temperature plasma on-axis which emits characteristic thermal radiation in the soft x-ray region.

The conventional electron impact sources use a suitable target material that is bombarded by a high-energy electron beam. These sources produce a broad spectrum of x-rays centered about characteristic lines of the material.

Synchrotron radiation is the electromagnetic radiation emitted by electrons moving at relativistic velocities along a curved trajectory with a large radius of curvature, for example, several meters to tens of meters. The energy of the photons ranges from a few electron volts to $10^5$ Ev. This corresponds to the binding energy of electrons in atoms, molecules, solids, and biological systems. Thus, synchrotron radiation photons have the right energy to probe the properties of such electrons and of the corresponding chemical bonds to understand their physical and chemical properties. The uses of electron accelerators as sources of synchrotron radiation have grown enormously during the last two decades. Unique features such as tunability and wide x-ray spectrum tend to render the synchrotron irreplaceable for many applications.

Presently, third generation synchrotron sources are being pursued that are based on high-energy electron storage rings and bending magnets. A typical electron accelerator can be tuned to emit synchrotron radiation in a very broad range of photon energies, from microwaves to hard-x-rays. Thus, it provides electromagnetic radiation in spectral regions for which no other usable sources exist, e.g., most of the ultraviolet/soft-x-ray range. Furthermore, it is by far the best source of hard-x-rays, even though other sources exist for this range. The system has met most application needs, but fails with respect to physical size and cost. They are inevitably large and expensive devices requiring complex supporting facilities. The current machines are very large and costly with tens to hundreds of millions of dollars. The nature of synchrotron x-ray sources means that they are expensive, remote multi-user facilities, and are therefore not suited for use with a laboratory scale. The alternative x-ray sources, such as electron impact systems, laser and discharge plasmas, cannot match synchrotron in terms of its tunability and continuum x-rays.

An object of the invention disclosed is to provide a small compact tunable x-ray source.

Another object is to provide a compact tunable x-ray source for laboratory use. For applications where a relatively small sample is practical, the availability of a laboratory-scale source would be very advantageous.

Another object is to provide a compact tunable x-ray source for security inspection applications such as more sensitive balcale x-ray inspection systems.

SUMMARY OF THE INVENTION

A low cost, compact, tunable x-ray source, that is based on an inertial electrostatic confinement (IEC) vessel design, is proposed. The IEC device is described in pending U.S. patent application Ser. No. 08/232,764 for "Inertial-Electrostatic Confinement Particle Generator" and Ser. No. 08/491,127 for "Electrostatic Accelerated Recirculating Fusion Neutron/Proton Source" which are incorporated herein by reference.

In the IEC-based x-ray source design, the electron storage ring of the synchrotron is replaced by recirculatory focusing electrons in a sphere that are accelerated by a grid, and the bending magnets are replaced by the electron—electron collisions in the sphere center. This arrangement results in an IEC synchrotron source (IEC-SS), wherein the mechanism for generating tunable x-ray radiation is essentially the same as in the bending magnet synchrotron sources. The IEC-SS operates at a much lower electron energy (<100 keV compared with >200 MeV in a synchrotron) while still giving a same radiated x-ray energy compensated by a bending radius of much smaller scale from electron—electron interactions. In short, electrons are accelerated 10's to 100 kev by the anode grid. Due to spherical (or other) convergence, the energetic electrons scatter in the center of the sphere. The scattering interactions create intense bremsstrahlung x-rays. The emitted x-ray energy is controlled by the grid bias.

DESCRIPTION OF THE PREFERRED EMBODIMENTS

Figure 1:
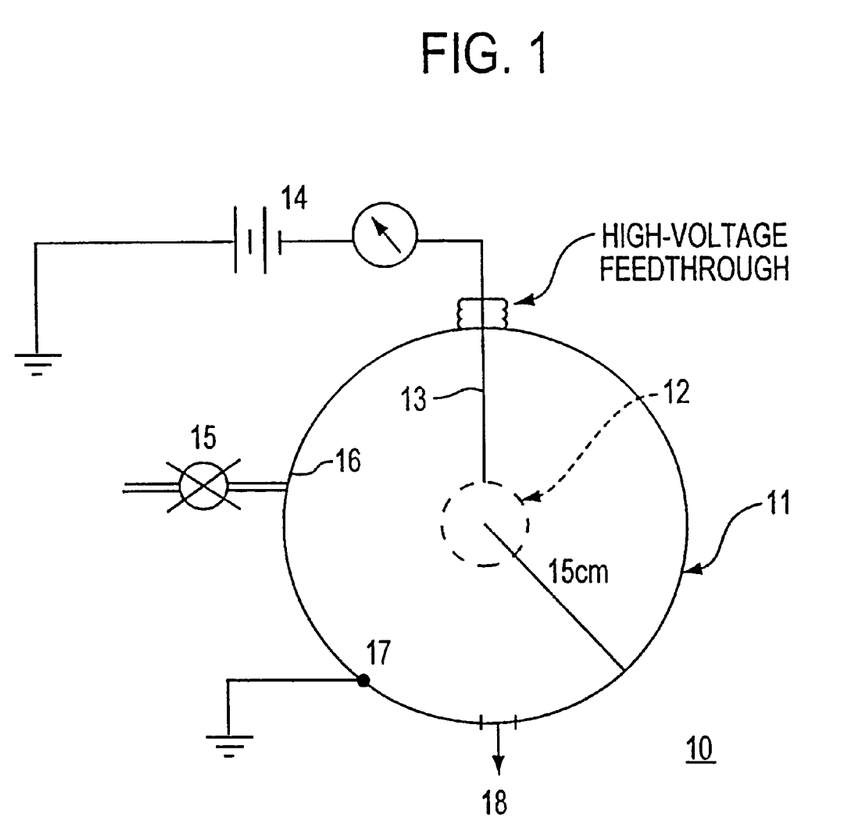
FIG. 1 is a schematic illustration of an IEC device.

An inertial electrostatic confinement (IEC) particle generator is described in U.S. patent application Ser. No. 08/232,764 (Miley et al.) which was filed on Apr. 25, 1994 and is incorporated herein by reference. The inertial electrostatic confinement device disclosed therein includes a vacuum vessel which is held at ground potential and contains internally and concentric to the vessel, a wire grid which acts as a cathode. The cathode may be made from a variety of metals having structural strength and appropriate secondary electron and thermionic electron coefficients. The cathode wire grid is connected to a power source to provide a high negative potential (30 kV–70 Kv), while the vessel itself is conductive and maintained at a ground potential. Deuterium or a mixture of deuterium and tritium gas is introduced into the vessel. A voltage is applied to the cathode wire grid and the pressure is adjusted in order initiate a glow discharge. To maximize the neutron yield per unit power input while maximizing grid life-time by reducing collisions with a grid, operational conditions are used to create a "star" glow discharge mode. The glow discharge generates ions which are extracted from the discharge by the electric field created by the cathode grid. These ions are accelerated through the grid openings and focused at a spot in the center of the spherical device. The resulting high energy ions interact with the background gas (beam-background collisions) and themselves (beam-beam collisions) in a small volume around the center spot, resulting in a high rate of fusion reactions. The result is a neutron generator producing neutrons as one of the D-T fusion reaction products. Where the ejection rates are high, the ejected ions may provide a deep-self generated potential well that confines trapped beam ions, creating even higher reaction rates. The device may be modified by using a field gas mixture of deuterium and helium-3 to be a source of protons as well as neutrons. One geometrical form of the device is spherical and as seen in FIG. 1. This device is based upon the principle of an ion accelerator with a plasma target. In a neutron-generator embodiment, deuterium-deuterium fusion reactions takes place in the plasma target and produce energetic neutrons. The device acts as a simple spherical plasma diode, having a ground potential on the outer sphere and a negative potential on a nearly geometrically transparent inner spherical grid. The spherical inertial electrostatic confinement device 10 is illustrated in FIG. 1 where a conductive vacuum chamber 11 is connected to a ground potential at contact 17. The device has a cathode grid 12 which defines a small sphere within the chamber and has a grid design that provides a high geometric transparency. In operation, however, this grid design has an even higher effective transparency, due to the effect of a concentration of ions into a "microchannels", as subsequently described. A source of power 14 is connected by a high voltage feed through to the internal cathode grid 12. The voltage has a negative value, thereby providing a bias between the relatively positive walls of the vacuum chamber and the central grid area. Gas is introduced into the vacuum chamber 11 by a control valve 15 and is evacuated by a pump 18.

Upon application of a potential to the cathode grid, under certain grid-voltage, gas pressure, gas type and grid-configuration conditions, high density ions and electron beams will form within the IEC device initiating a "star" mode of operation. In this mode, high density space charged neutralized ion beams are formed into microchannels that pass through the open spaces between the grid wires. As the ions avoid contact with the wires, this mode increases the effective grid transparency to a level above the geometric value. These microchannels significantly reduce grid bombardment and erosion and increase power efficiency. For conventional star mode operation, the grid and microchannel beams are symmetric so that a convergent high-density core develops. The inertial electrostatic confinement device serves as a valuable source of neutrons or protons.

The spherical inertial electrostatic confinement (IEC) device has been used as a plasma fusion reactor. In a plasma fusion reactor, the energy production must compete with inevitable losses, and the role of the processes which result in such losses is crucial in determining the operating temperature of a plasma fusion reactor. Some energy losses can be minimized by a suitable choice of certain design parameters, but others are inherent in the reacting system; one of these is bremsstrahlung radiation. The efficiency of neutron production competes with the inevitable losses of bremsstrahlung radiation that are inherent in the reacting system. High intensity x-rays were measured in experiments Hirsch's x-ray measurement. Previously, the goal was to minimize the bremsstrahlung radiation by a suitable choice of certain design parameters. Affirmative use of this property can permit a device to serve as x-ray source.

Figure 2:
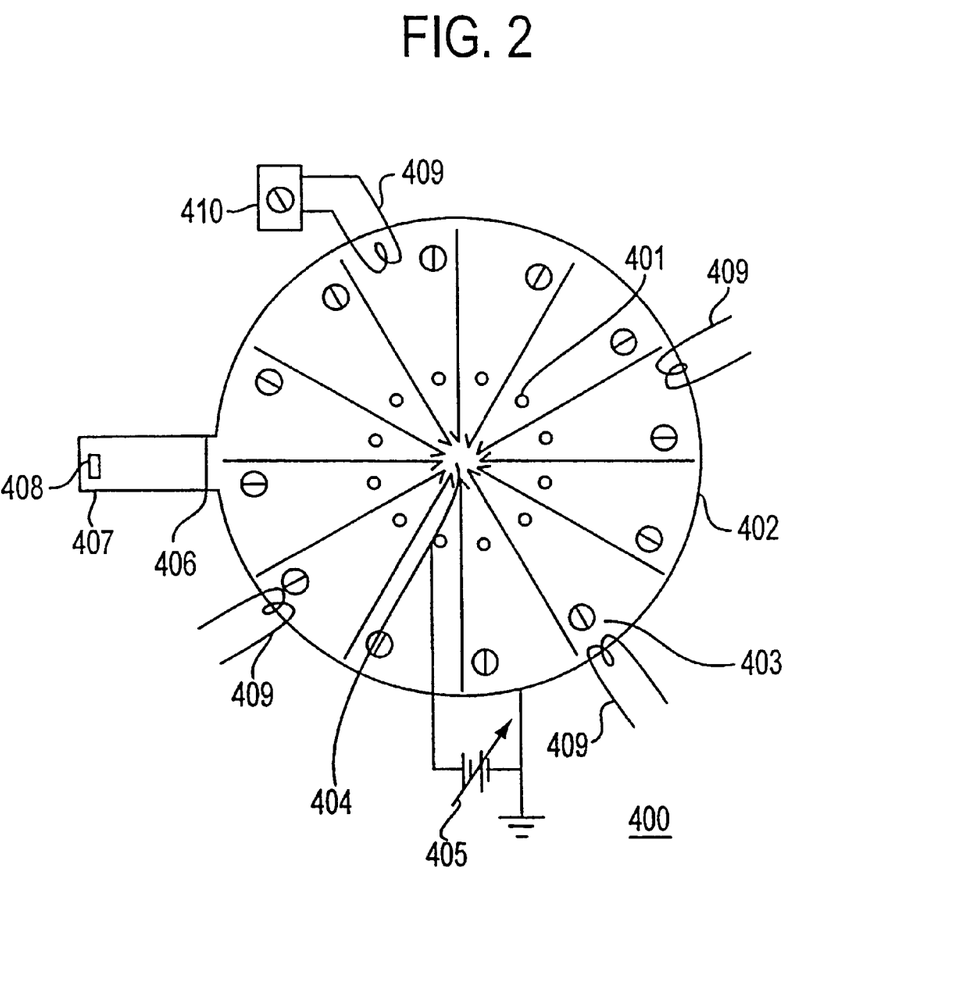
FIG. 2 is a schematic illustration of an IEC-SS x-ray source in accordance with the present invention.

An IEC plasma x-ray source may have the general structure as seen in FIG. 2, wherein electrons are injected into the center of a spherical IEC device 400, formed from two spherical concentric electrodes. The inner electrode 401 (anode) made of a highly transparent grid (>90%, preferably >95%, transparency) is charged to a positive voltage, preferably in a range of 1 kV to 150 KV, relative to the outer grounded electrode 402 (cathode), at driving currents varying from 1 mA to 100 mA. The outer electrode is a hermedically sealed vacuum chamber that supports a pressure of less than $10^{-6}$ Torr. Electrons emanating from the cathode 402 are attracted to the anode 401, and pass through the anode (grid) many times before being captured by the grid. Due to spherical convergence, the injection of electrons constitute an accumulation of electrons that forms a dense electron cloud which then can be used to accelerate and heat ions. The electrons are injected by electron emitters 409 which are electrically heated to generate the electrons. There are at least two, preferably four to eight, such assemblies, and each assembly is comprised of an electron emitter and an electron extractor. The operation generates intense bremsstrahlung radiation in the spherical center due to the strong electron—electron interactions at a relativistic speed accelerated by the grid bias. The energy spectrum of the emitted x-rays shifts as the grid bias is changed. Notably, the bias on this configuration is opposite to that seen in FIG. 1, wherein the central grid is a cathode and the chamber 11 serves as an anode.

As is well known, the plasma in a thermonuclear reactor consists of stripped nuclei of hydrogen isotopes together with electrons. From such a plasma, energy will inevitably be lost in the form of bremsstrahlung, that is, radiation emitted by charged particles, mainly the electrons, as a result of deflection by the Coulomb fields of other charged particles.

An expression for the rate of electron-ion bremsstrahlung energy emission of the correct form L. Spitzer, USAEC Report NYO-6049 (1954), P. 9., but differing by a small numerical factor from the result obtained by a more rigorous procedure, can be derived from the classical expression for the rate $P_e$ at which energy is radiated by an accelerated electron, namely, $$P_e = \frac{2}{3}\frac{e^2}{c^3}a^2 \qquad (1)$$

where e is the electron charge, c is the velocity of light, and a is the electron acceleration. The total power $P_{br}$ radiated as bremsstrahlung per unit volume has been calculated in a Maxwellian distribution of velocity among the electrons in a system containing a single ionic species of charge Z. S Glassston and R. H. Lovberg Controlled Thermonuclear Reactions, Van Nostrand Reinhold Company, 1960, Chapter 2.

$$P_{br} = \frac{16\,\pi^2}{3^{1/2}}\frac{(kT_e)^{1/2}e^6}{m_e^{3/2}c^3 h}n_e n_i Z^2 \qquad (2)$$

where $T_e$ is the kinetic temperature of the electrons in a Maxwellian distribution, $n_e$ and $n_i$ are the density of electron and ion, respectively, $m_e$ is the electron rest mass, and h is Planck's constant. The classical expression for the rate of bremmstrahlung emission per unit volume per unit frequency interval in the frequency range from v to v+dv is $$dP_v = \frac{16\,\pi^2}{3^{1/2}}(kT_e)^{1/2}\frac{e^6}{m_e^{3/2}c^3}n_e n_i Z^2 \exp(-hv/kT_e)dv. \qquad (3)$$

Figure 4:
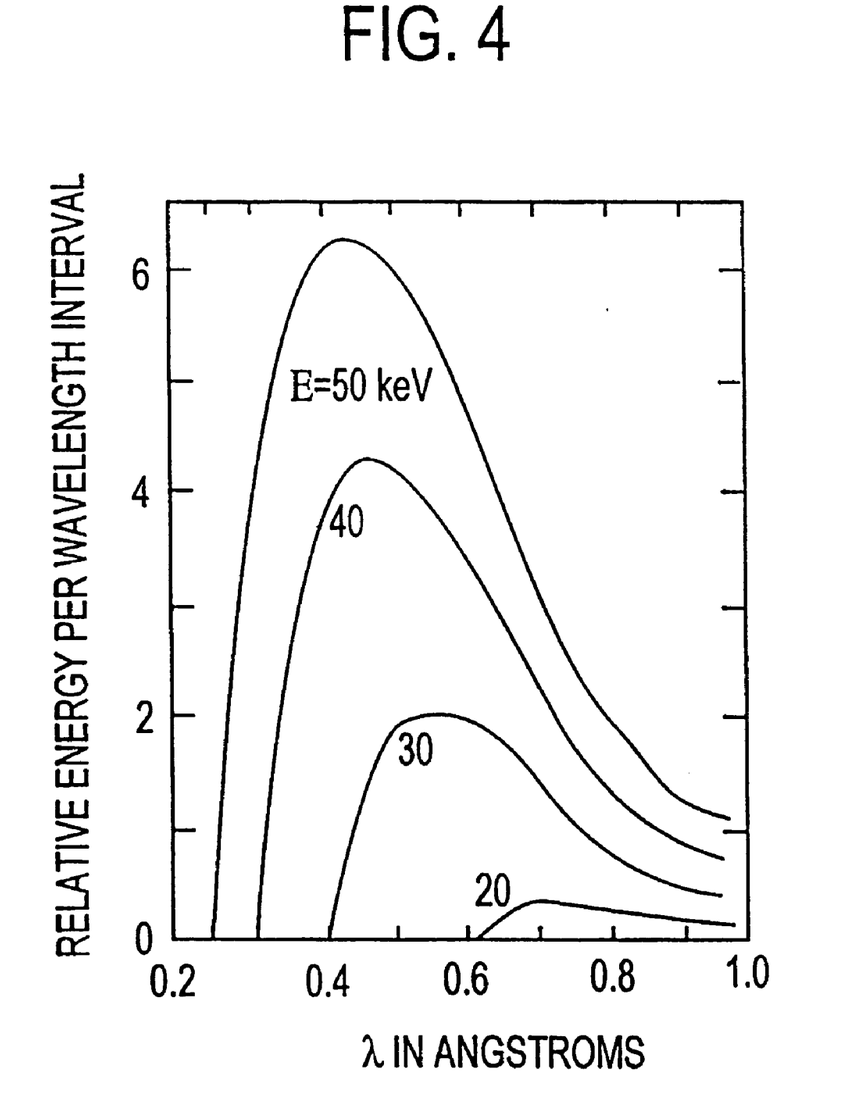
FIG. 4 is an intensity vs wavelength graph pertinent to the present invention.

Upon integration over all frequencies, this expression leads to equation (2). For arbitrary electron and ion densities, the equation (3) expressed in terms of wave length, the relative values of $Dp\lambda_v/d\lambda$ have been plotted as a function of wave length in FIG. 4 (From C. T. Ulrey: Phys. Rev., 11:401 (1918), as cited on page 616, Evans, *The Atomic Nucleus*, McGraw-Hill, Inc., (1972). While this calculation was performed for a thick tungsten target, the shape of the spectra is expected to be quite similar to that obtained from the IED due to the similarity of the x-ray production mechanisms. To the left of the maximum for each curve, the energy emission as bremsstrahlung is dominated by the exponential term and decreases rapidly with decreasing wave length. The bremsstrahlung power distribution is calculated assuming a Maxwellian electron velocity distribution. For monoenergetic electron velocity, the distribution is expected to be narrower.

At temperature below 50 kev, the bremsstrahlung from a plasma arises almost entirely from electron-ion interactions. At high temperatures, the production of bremsstrahlung due to electron—electron interactions, as distinct from those resulting from the electron-ion interactions, will be significant. Provided relativistic effects do not arise, there should be no electron—electron bremsttrahlung, but at high electron velocities such is not the case and appreciable losses can occur from this form of radiation. The following results will provide a general indication of the situation. At an electron kinetic temperature of 25 keV the ratio of electron—electron bremsstrahlung energy to that for electron-ion interaction is estimated to be 0.06, at 50 keV it is 0.13, and at 100 keV it is 0.34. C. F. Wandel, et al, Nuclear Instr., 4, 249 (1959). R. F. Post, Ann. Rev. Nuclear Sci, 9, 367 (1959).

In the IEC configuration, under proper conditions of current-voltage-pressure, a virtual cathode can form. [G. Miley et al, Inertial-Electrostatic Confinement Neutron/Proton Source, AIP conf. proc. 299. Editors: M. Haines, A. Knight.] In that case, deceleration of the electrons as they approach the virtual cathode makes an additional contribution to the x-ray yield. [R. Eisberg, Quantum Physics of Atoms, Molecules, Solids, Nuclei, and Particles, 2nd Ed., John Wiley and Sons, 1985.] This term can equal or dominate the electron/electron collisional contributions, depending of the height of the virtual cathode. Since electrons can lose their entire energy x-rays in this case, the effect generally causes a shift of the x-ray spectrum to higher energies.

Figure 3:
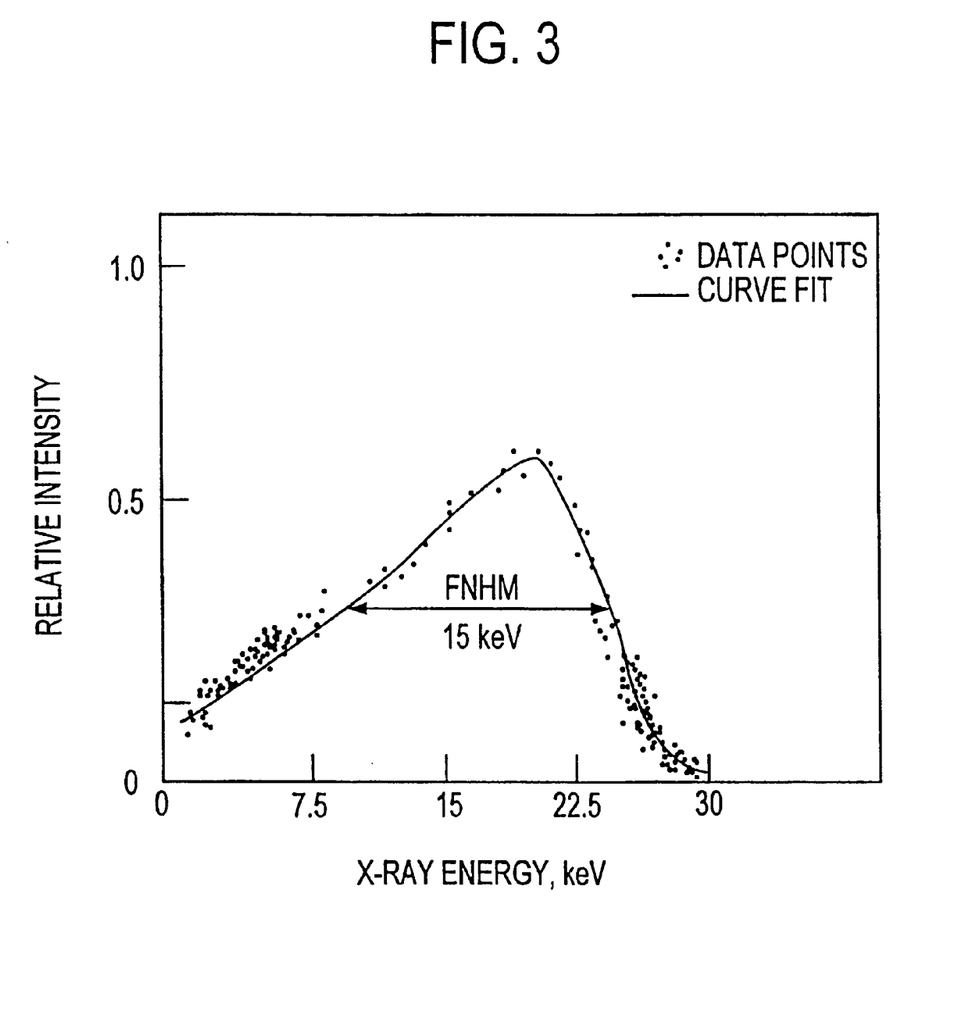
FIG. 3 is a measured X-ray spectrum.

Experimental measures of the x-ray spectrum have been carried out using the experiment setup described in FIG. 2. Results are shown in FIG. 3. As expected, the data follows along a curve very similar to calculated spectra, previously shown in FIG. 4.

The IEC spectrum in FIG. 3 was taken with the applied voltage set at 30 kV. The measured spectrum is somewhat broad having a 15 keV full-width at half-maximum (FWHM) for a spectrum ranging up to 230 kV (comparable to a 12 keV FWHM for E-30 keV in FIG. 4). The peak of the distribution can be shifted by varying the applied grid voltage to give a series of spectra similar to that of FIG. 4. For many experiments, a broad-range spectrum of this nature is quite useful. However, in some cases it may be desirable to employ a narrow band of x-ray energies.

Figure 5:
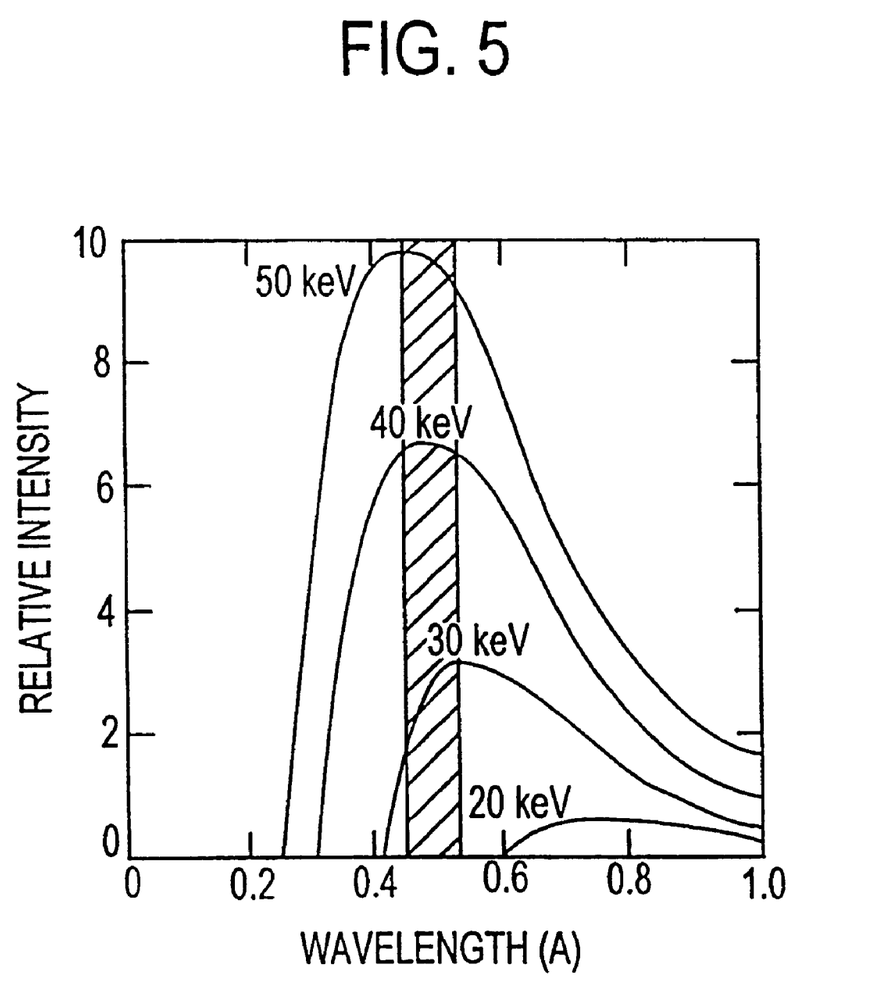
FIG. 5 is an intensity vs wavelength graph pertinent to the present invention.

If so, a narrower spectrum or "band" can be selected by Bragg reflection from crystal surfaces, or by diffraction gratings, or by using other "conventional" x-ray optics techniques (J. B. Murphy et al., "Synchrotron radiation resources and condensers for projection x-ray lithography," Appl. Optics, vol. 32, no. 34, pp. 6920–6929 (Dec. 1, 1933); I. A. Artyukov et al., "On the efficiency of grazing incidence optics: the spiral collimator," in *Short Wavelength Lasers and Their Applications*, Nova Science Publishers, Inc., N.Y., pp. 299–310 (1992); H. Takenaka et al., "Heat resistance of Mo-based and W-based multilayer soft x-ray mirrors," in *Laser Interaction and Rolation Plasma Phenomena*, 12 International Conference, Osaka, Japan 1995, Part II, American Institute of Physics, pp. 808–813 (1992).) Such x-ray band selection is especially desirable in certain types of experiments or industrial applications where a narrow range of x-ray energies is desired. By using band selection techniques, the IEC voltage is first tuned to optimize the overall x-ray spectrum in the range desired. The x-ray band selector is then employed to further narrow the range of x-ray wavelengths striking the target or spectrum under treatment. This process is illustrated in FIG. 5. Assuming that x-rays in the wavelength range 0.45–0.55 nm are desired, the IEC voltage is first raised to 50 kV. This shifts the maximum intensity of the broad x-ray spectrum such that, as seen in the figure, the peak lies over the desired range. Then, an appropriate band selection technique (diffraction grating, etc.) is employed to select the 0.45–0.55 nm band. As observed from the figure, this procedure, adjusting the IEC x-ray spectrum followed by band selection, optimizes the x-ray intensity obtained in the desired range. If the IEC voltage had not been optimized, e.g., left at 30 kV or lower, the figure shows that the intensity in the desired band would be reduced by 50% or more.

Otherwise, if a narrow wavelength of x-rays is not required, the tuned IEC x-ray can be used directly.

Figure 6A:
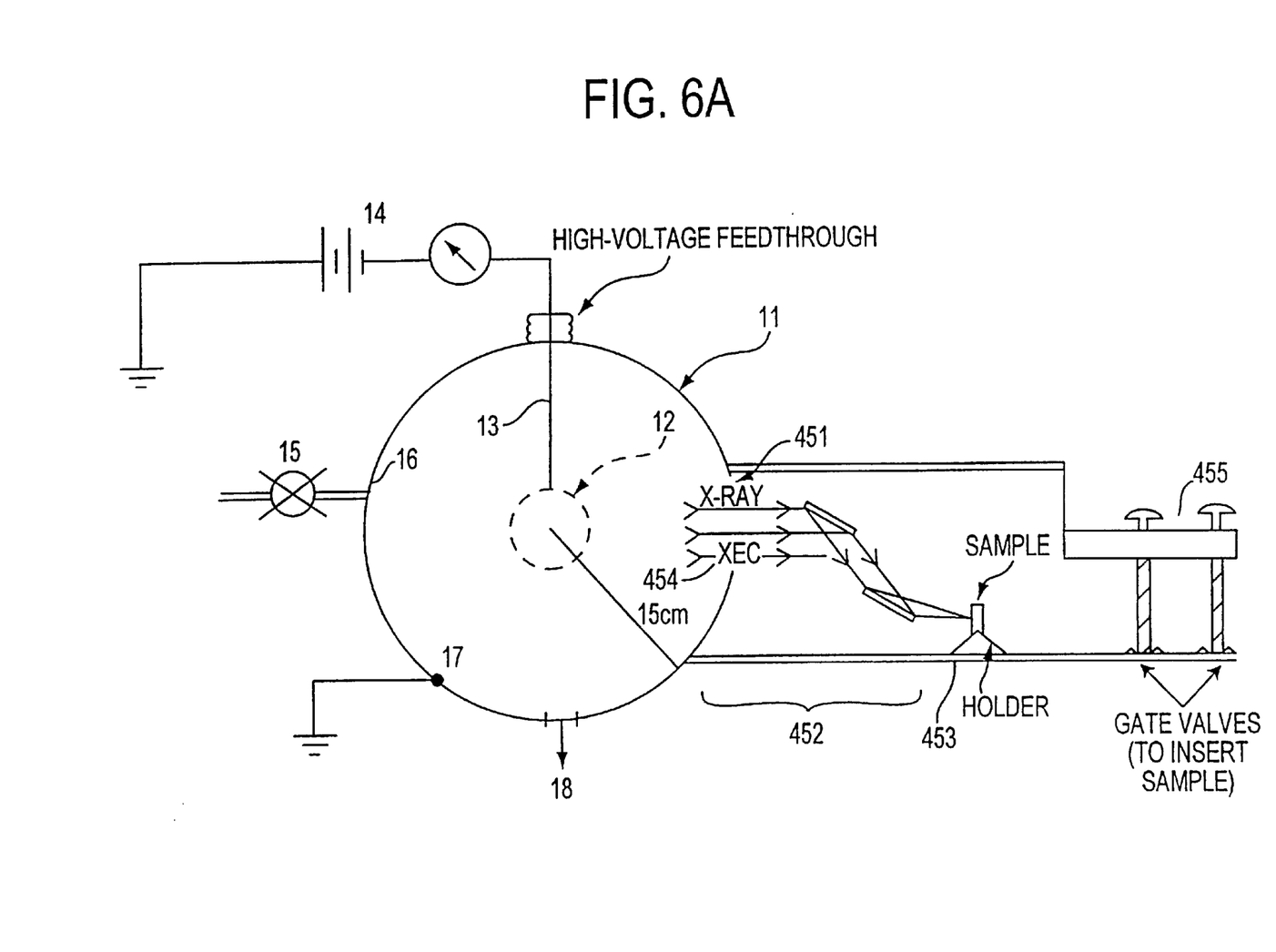
FIG. 6a is an illustration of a vacuum port target holder arrangement.
Figure 6B:
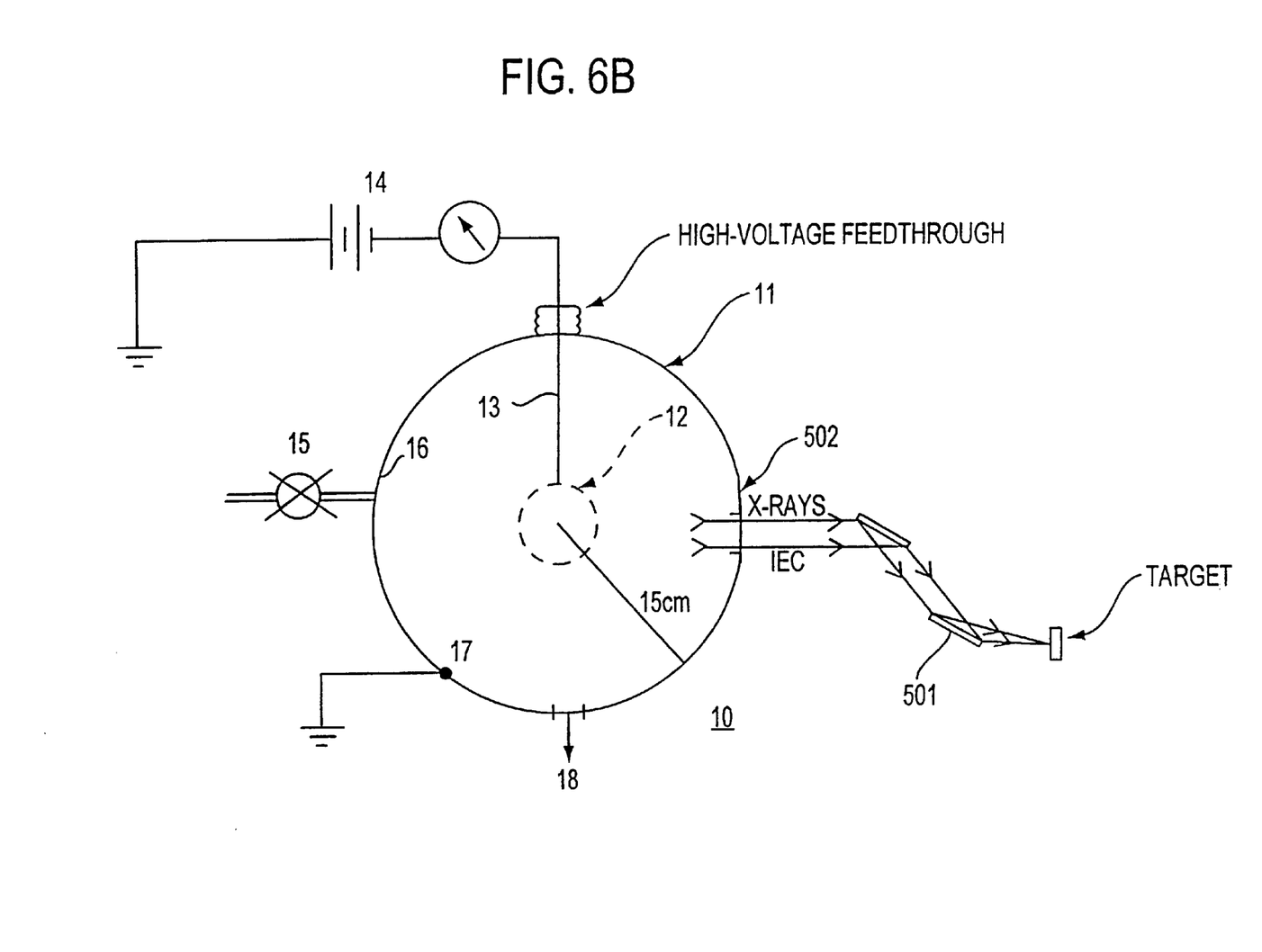
FIG. 6b is an illustration of an x-ray window-external target arrangement.

Coupling of the band selection optics to the IEC x-ray source can be accomplished in a variety of ways. Two characteristic methods, illustrated in FIGS. 6a and 6b, differ by inserting the selection optics and target inside the IEC vacuum chamber 11, or using external optics 501 with x-rays extracted from the vacuum vessel through a thin, vacuum-tight, metallic x-ray window 502. FIG. 6a uses "conventional" x-ray diffraction optics 451 (C. V. Azaroff, *X-ray Spectroscopy* McGraw-Hill, N.Y., (1973).) for band selection. It and the target 452 are located in an expanded port 453 on the side of the IEC. The port 453 is connected through an opening 404 in the main vacuum vessel such that x-rays escape the IEC grid region and enter the optics system while the port volume is maintained under vacuum conditions through the main chamber pumping system. A double valve 455 arrangement on the end of the port allows convenient insertion and removal of targets/specimens without breaking the main chamber vacuum. This method has the advantage that the x-rays escaping the IEC are not attenuated by use of a vacuum window (such as in FIG. 6b), and the target can be maintained under vacuum conditions. On the other hand, insertion and removal of the target/speculum through the double gate valve system is a complication. If a slightly reduced x-ray intensity is tolerable, and if the target need not be maintained under vacuum, the external arrangement of FIG. 6b can be used. Here x-rays from the IEC chamber 11 escape through a low-Z metallic window 502. A low-Z material such as Be would be used to minimize x-ray attenuation which maintaining structural strength to hold vacuum conditions. Select glasses containing a minimum concentration of high-Z materials like lead could also be employed if visual observation into the chamber were desired. The two arrangements in FIG. 6 are considered typical examples. A number of variations in geometry, and selection optics, target/spectrum insertion/removal could be considered for specific applications. For example prisms also may be used.

Figure 7:
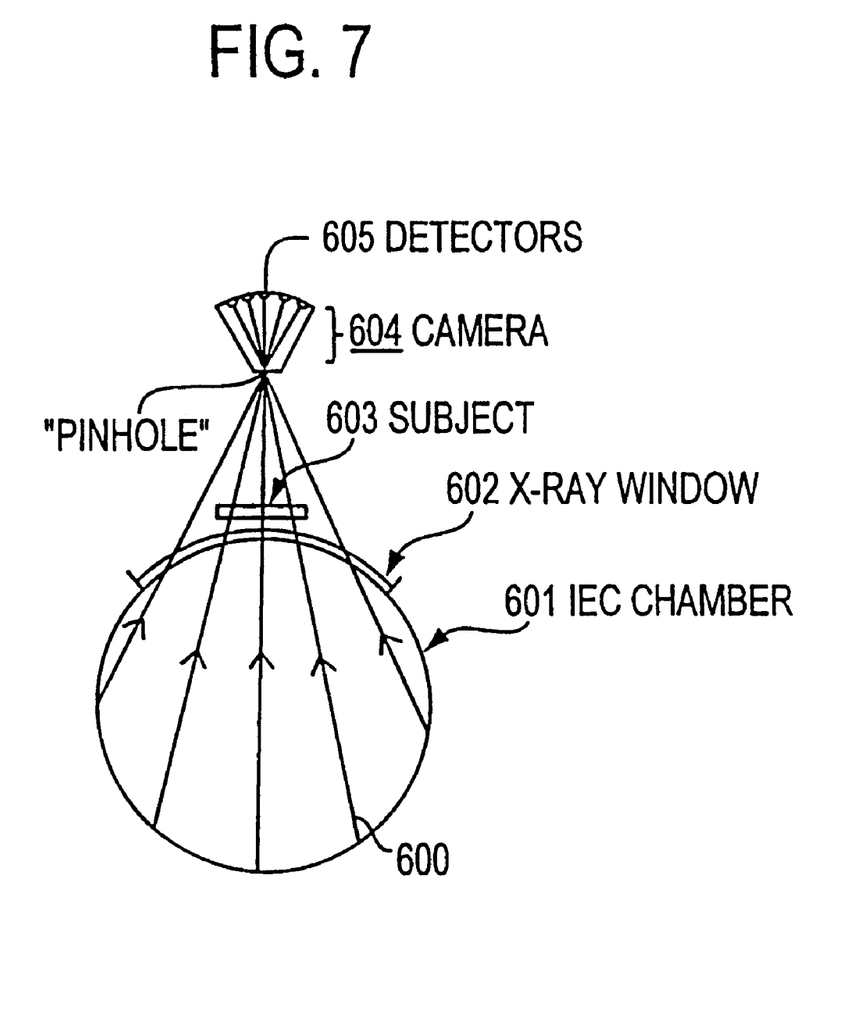
FIG. 7 is a schematic illustration of a pin hole camera system for x-ray imaging using the x-ray source.

Other applications of the IEC x-ray source 601 involve x-ray imaging. Such techniques for using soft x-rays are well-known, e.g., I. H. Hutchinson, *Principles of Plasma Diagnostics*, Cambridge University Press, N.Y., (1987). A typical approach for adapting the IEC to this use is illustrated in FIG. 7. In this figure, the x-rays 600 are passed through a conventional pinhole camera system 604, the image being recorded on a detector 605 as shown or on photographic film. The subject 603 being photographed would be placed in the x-ray path in the appropriate position desired to obtain the focal length. The subject would be sufficiently thin that x-ray transmission through it would be possible. An x-ray window is used in the arrangement illustrated in analogy with FIG. 6b. However, if a vacuum arrangement is desired, a geometry similar to FIG. 6a could be employed.

The foregoing characteristics of the bremsstrahlung effect in a plasma can be the basis for the proper selection of parameters in an IEC device such that a turnable x-ray source can be achieved. As seen in FIG. 2, in an IEC-SS system 400 electrons from electron emitters 409, which are heated by application of an electric current of 1A to 15A at a driving voltage of 5–15V, from a source 410, are accelerated 10's keV up to 100 keV by a spherical anode grid 401 that is disposed within a spherical vacuum confinement vessel 402, which also serves as a cathode. The spherical wire grid 401 is a self-supporting structure, free from internal supports, having a plurality of openings through which electrons may flow. The grid also may be formed of a plurality of vanes, joined together in a geometric pattern which provides a thin profile when viewed in a radial direction in order to achieve a high geometric transparency. Due to the spherical convergence, the energetic electrons 403 collide in the center of sphere 404. The interactions between the high energy electrons create intense x-rays. The x-ray spectra are dependent on the electron energy controlled by the grid bias 405. The x-rays are directed to a window 406 in a wall of the vessel and transmitted via a cylindrical passage 407 to a detector 408. Within the passage or at other convenient locations in the path of the X-rays, a means for narrowing the spectrum of the x-rays could be disposed. Such means could be a device using Bragg reflection from a crystal surface, diffraction gratings, prisms, or the like. The IEC-SS makes possible the generation of x-rays using relatively low-energy electrons. The IEC-SS has a number of potentially unique and attractive features which may serve a variety of applications. These features include compactness, relatively low cost, tunability, high photon energy operation. The relatively narrow natural line-width associated with the IEC-SS can provide less unusable radiation which could damage optics and target samples. In addition, by varying the electron pulse energy in an IEC-SS pulsed mode, chirped x-ray pulses may be generated. The pulse structure, tunability and high photon energy capability of the IEC-SS may provide an important tool for studying ultra-fast phenomena. Furthermore, the relatively low cost and compactness of a IEC-SS can make synchrotron light sources more readily available to users.

Extended x-ray absorption fine structure (EXAFS), which is a powerful tool for structural determination in the materials, biomedical, and many other scientific fields, has been studied usually at synchrotron radiation (SR) facilities, so far. The development of instruments for EXAFS measurements in a laboratory is important because of their complementary usefulness for experiments with SR, especially when special sample preparation and/or quick feedback of the analysis are required. The problem with EXAFS measurements performed in a laboratory is mainly the degradation of spectrum caused by strong characteristic x-ray lines from the source. It is important to develop an x-ray source for dedicated use in EXAFS experiments. So far, the x-ray sources have been mostly used for x-ray diffractometry. Therefore, the electron gun is usually designed to operate at high tube voltage to provide strong characteristic x-rays. On the contrary, an EXAFS experiment requires intense continuum x-rays. The use of laboratory base IEC-SS may alleviate e this problem.

One practical application of the e IEC-SS x-ray beam is to significantly enhance the imaging ability of low concentration of trace elements in the human body. Specifically, it could be used in digital differential angiography (DDA), a new medical x-ray diagnostic concept. P. R. Moran, et al, Physics Today, July (1983); also in "Optics Today," edited by J. N. Howard (AIP, New York, 1986), p. 308. This new technique is a differential x-ray absorption diagnostic procedure for imaging blood vessels. In conventional angiography, x-ray imaging of blood vessels is achieved by intravenously injecting an x-ray absorbing substance such as iodine. The available x-rays used for imaging are extremely broad band and large doses of both iodine and x-rays are required. A tunable x-ray beam, using a differential x-ray absorption technique, would be a very sensitive diagnostics tool for measuring low concentrations of iodine at a reduced radiation dose. Iodine has a K-edge absorption at a photon energy of ~33 kev. In DDA, two x-ray beams are used: on at 33 kev (energy for peak absorption in iodine) and the other at ~30 kev. The mass attenuation coefficients for these two photon energies differ by a factor of ~8. The photon flush through the tissue is proportional to the exponent of the mass attenuation coefficient times the mass thickness of the tissue. Therefore, the difference between the 33 kev photon image and the 30 kev photon image is a direct and sensitive measure of the concentration of iodine, while the images of the bones and other tissues not containing the iodine is suppressed. This differential x-ray absorbing technique would use much lower concentrations of iodine injected "noninvasively" into the heart via the bloodstream. The imaging and subtraction of the two x-ray beams would be performed at the same time and, therefore, patient movement during the imaging process would not be a factor.

While the present invention has been described in connection with several preferred embodiments, the invention is not limited thereto, and its scope is to be defined by the following claims.

What is claimed is:

1. A device for generating wave-length tunable x-rays comprising:

cathode means comprising a spherical vacuum vessel;

anode means comprising a highly transparent spherical grid defining a central spherical volume, said anode means being centrally disposed within said cathode means;

electron means comprising a plurality of electron emitter/extractor assemblies placed symmetrically near an internal surface of said cathode means for emitting electrons into said vessel;

means for creating a negative atmospheric pressure in said spherical vacuum vessel;

means for circulating electrons emitted by said electron emitter assemblies a plurality of times through a central region formed at the center of said spherical vacuum vessel;

means for focusing and converging high energy electrons in said central region;

means for applying an electric potential to said anode means whereby the potential between the anode and cathode means causes the electrons to accelerate towards the anode means, the increased energy electrons interacting with idle electrons in said central region thereby producing x-rays, whereby electrons at different energy levels produce x-rays at correspondingly different wave-lengths.

2. The device as set forth in claim 1 wherein said electron emitter/extractor assembly further comprises means for applying electric current to heat said electron emitter/extractor assemblies.

3. The device as set forth in claim 1 wherein said electron emitter/extractor assembly further comprises means for applying electric potential to said electron emitter/extractor assemblies to extract electrons.

4. The device as set forth in claim 1 wherein the spherical grid is a self-supporting structure, free from internal supports, having plurality of opening through which electrons may flow.

5. The device as set forth in claim 4 wherein said grid comprises at least one of a wire and a vane structure.

6. The device as set forth in claim 1 comprising at least 2 electron emitter assemblies.

7. The device as set forth in claim 6 comprising two to eight electron emitter assemblies.

8. The device as set forth in claim 1 wherein the electron emitter/extractor assembly comprises an electron emitter and an electron extractor.

9. The device as set forth in claim 2 wherein said cathode means is held at ground potential and the anode means is a conductive electrode having power leads connected, passing through the spherical vacuum vessel and insulated therefrom and being connected to the means for applying electric potential.

10. The device as set forth in claim 1 wherein said spherical vacuum vessel is hermetically sealed metallic shell.

11. The device as set forth in claim 1 wherein the means for applying electric potential to said anode grid provides a positive potential within a range between 1 Kv to 150 Kv.

12. The device as set forth in claim 1 wherein the means for applying electric potential to anode grid employs driving currents within a range of 1 Ma to 100 Ma.

13. The device as set forth in claim 1 wherein said grid has a geometric transparency of greater than or equal to 95%.

14. The device as set forth in claim 1 wherein the pressure in said spherical vacuum vessel is less than $10^{-6}$ Torr.

15. The device as set forth in claim 1 wherein said electric potential to the anode means is within a range of positive potential between 50 V to 300 V.

16. The device of claim 3 wherein said means for applying an electric potential to said electron extractor employs driving currents varying in a range between 10 Ma to 5 A.

17. The device in claim 2 wherein the means for applying electric current to heat said electron emitter provides a current that varies within a range between 1 A to 15 A inclusive.

18. The device in claim 3 wherein the means for applying electric current to heat said electron emitter employs a driving voltage that varies within a range varying from 5 V to 15 V inclusive.

19. The device in claim 1 wherein said grid comprises at least one of a wire and a vane structure, whereby the profile when viewed in any radial direction will be thin and thus achieve high geometric transparency defining a central spherical volume.

20. The device in claim 1 further comprising means for narrowing the spectrum of said produced x-rays.

21. The device of claim 20 wherein said means utilizes at least one of defraction gratings or prisms.

22. The device of claim 1 further comprising means for having a target for said x-rays disposed within said vacuum vessel.

23. The device of claim 1 further comprising a window for permitting x-rays to escape from said vacuum vessel.

24. The device of claim 23 further comprising means for having a target for said x-rays disposed outside of said vacuum vessel.

25. The device of claim 24 further comprising a camera system for receiving x-rays passing through said target.

26. The device of claim 22 further comprising a camera system for receiving x-rays passing through said target.

* * * * *